C. H. KÖHN.
TRACTION ENGINE.
APPLICATION FILED JULY 31, 1909.
992,211.
Patented May 16, 1911.
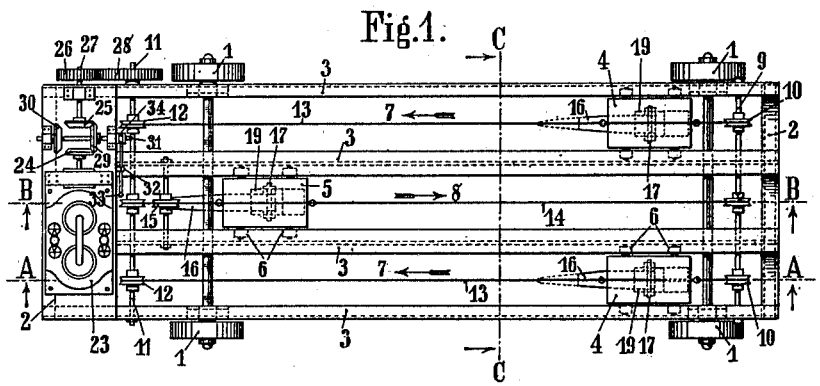
Fig. 1.
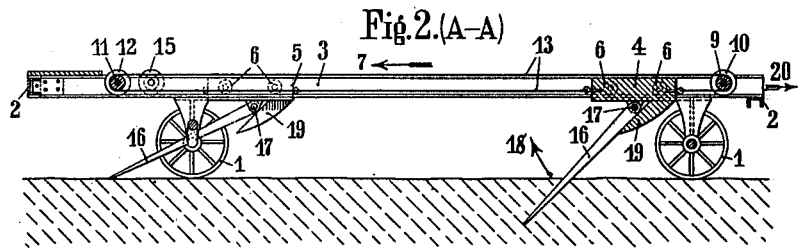
Fig. 2. (A-A)
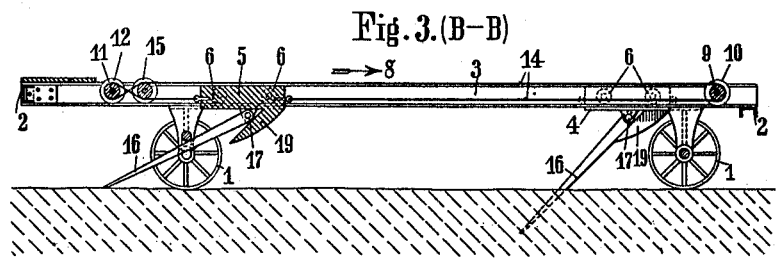
Fig. 3. (B-B)
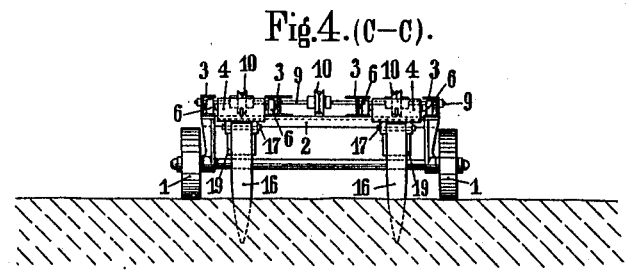
Fig. 4. (C-C).
WITNESSES:
INVENTOR,
CLAUS HINRICH KÖHN,
by
Attorney.

UNITED STATES PATENT OFFICE.

CLAUS HINRICH KÖHN, OF STADE, GERMANY, ASSIGNOR OF ONE-HALF TO ERNST TÄUBERT, OF LEIPZIG, GERMANY.

TRACTION-ENGINE.

992,211.      Specification of Letters Patent.      Patented May 16, 1911.

Application filed July 31, 1909. Serial No. 510,611.

*To all whom it may concern:*

Be it known that I, CLAUS HINRICH KÖHN, a subject of the Emperor of Germany, and resident of Stade, Germany, have invented a certain new and useful Improvement in Traction-Engines, of which the following is a specification.

This invention relates to traction engines.

According to the invention, the actuating motor is mounted on a wheeled frame on the side members of which frame run carriages movable in opposite directions each provided with a sprag which enters the ground when the carriage connected thereto reaches the forward end of the frame, so that the carriage is arrested and the frame is caused to move relatively to the carriage until its rear end approaches the arrested carriage; whereas, if the actuating mechanism is reversed, the sprag of another carriage enters the ground and the first carriage moves from the rear end of the frame to the forward end thereof, and its sprag is again forced into the ground, the actuating mechanism being again reversed, and the operation being repeated.

A traction engine of the kind described is illustrated by way of example in the accompanying drawings in which—

Figure 1 is a plan, and Figs. 2, 3 and 4 are sections on the lines A—A, B—B and C—C respectively of Fig. 1.

In the embodiment of the invention illustrated in Figs. 1 to 4, three traveling carriages are provided on the frame, two outer carriages and one inner carriage, the two outer carriages moving in the opposite direction to the inner carriage, so that when the two outer carriages are in their extreme rear position at the end of the frame the inner carriage may be in its extreme forward position at the front of the frame and its sprag engages with the ground so that the frame is moved forward.

The frame carried by the four wheels 1 comprises longitudinal beams or side members 3 formed of U or I-shaped iron and stiffened by cross bars 2. Between the members 3 are arranged traveling carriages 4 and 5 the wheels or rollers 6 of which move between the upper and lower flanges of the beams 3. When the outer carriages 4 run on the frame in the direction shown by the arrow 7, the inner carriage 5 runs in the direction shown by the arrow 8.

At the forward end of the frame is mounted a shaft 9 on which are keyed rope or chain pulleys 10 for the carriages 4 and 5. At the rear end of the motor vehicle frame is mounted a shaft 11 on which are keyed rope or chain pulleys 12. The ends of the ropes 13 are attached to the carriages 4 so that on rotation of the shaft 11 and therefore of the pulleys 12 in one direction the ropes 13 and carriages 4 are moved in a corresponding direction. To the end of the carriage 5 is attached a rope 14 which is guided in open position around the front pulley but is guided in crossed position by means of an auxiliary pulley 15 around the rear pulley 12 (Fig. 3) so that when the pulley 12 is rotated in one direction the carriage 5 must move in a direction opposite to the direction of movement of the carriages 4.

The carriages 4 and 5 are provided with spikes or sprags 16 which are pivoted at 17. These sprags 16 can swing in the direction of the arrow 18 but are prevented from swinging in the opposite direction by lugs 19 on the carriages 4 and 5, said lugs serving as supports. If the position of the carriages be that shown in Fig. 1 and if the shaft 11 with pulleys 12 be set in motion by the motor, so that the carriages 4 must move in the direction of the arrow 7, while the carriage 5 must move in the opposite direction, the following action takes place:—

The sprags 16 of the carriages 4 dig into the ground on movement of the carriages 4 in the direction of the arrow 7 while they are supported by the projections 19. If the shaft 12 be now further rotated in the same direction, since the carriages 4 are arrested by the sprags 16, the frame running on wheels 1 moves relatively to the carriages 4 in the direction of the arrow 20 (Fig. 2). The carriage 5 which is moved in the other direction by means of the crossed rope 14 runs from the rear end of the frame in the direction of the arrow 8 toward the forward end of the frame, as its sprag 16 does not offer any resistance to this motion, but slides over the ground (Figs. 2 and 3). This movement of the frame relatively to the carriages 4 continues until the rear end of the same reaches the carriages 4 the carriage 5 having by this time run to the forward end of the frame. At this moment reversal of the shaft 11 and the rope or chain pulleys 12 is effected either automatically or by hand, and the outer carriages 4 now run from the rear end of the frame to its forward end while the sprag 16 on the central carriage 5 enters the ground, so that the carriage 5 is arrested and the frame must again move along the carriage 5. By reversing the actuating mechanism at the extreme positions of the carriages 4 and 5, the frame is moved continuously in the direction of the arrow 20, Fig. 2.

The actuation of the shaft 11 and of the rope or chain pulleys keyed thereto is effected by a motor of suitable construction mounted on the rear end of the frame, for example a petrol engine 23 provided with reversing gear adapted to be reversed by means of the carriages themselves, so that when the carriages reach their extreme positions the direction of rotation of the shaft 11 is reversed. This reversing gear may for example, consist of a bevel pinion 24 keyed to the motor shaft, which pinion is continuously rotated in the same direction. Opposite this pinion is arranged the bevel pinion 25 for actuating the shaft 27 carrying the pinion 26. The shaft 11 is actuated from the pinion 26 by a pinion 28. The motion of the bevel pinion 24 is transmitted to the bevel pinion 25 by means of one or two reversing wheels 29 and 30 keyed on an axially movable shaft 31. If the pinion 29 meshes with pinions 24 and 25, the transmission of the rotary movement of the pinion 24 to the pinion 25 is effected in one direction, but if the pinion 30 meshes with the pinions 24 and 25 the transmission of the rotary movement is in the opposite direction. The reversal of the pinions 29 and 30 is automatically effected by the carriages 4 and 5. For instance, if the carriage 4 in its extreme rear position strikes on the front end of the axially movable shaft 31, the bevel pinion 29 is brought into gear, while, if the central carriage 5 strikes the front end of the double lever 33 which is pivoted at 32, and which engages, with its front fork 34, the shaft 31, the bevel pinion 30 is brought into gear and the shaft 11 thereby reversed.

Having described my invention what I claim and desire to secure by Letters Patent of the United States is:—

In a traction engine, in combination, a wheeled frame comprising longitudinal bars, carriages movable in opposite directions having rollers running on said bars, sprags pivoted on said carriages, said sprags adapted to dig into the ground when the carriages are moved rearwardly relatively to the frame, and to slip over the ground when the carriages are moved forwardly relatively to the frame, a cross shaft at the front end of the frame, a cross shaft at the rear end of the frame, pulleys on said shafts, tensile connections between the pulleys and the carriages, a motor mounted on the frame, reversible gearing interposed between the motor and the rear shaft, said gearing including devices in the path of the carriages for reversing said gearing.

In testimony whereof I have signed my name to this specification in the presence of two subscribing witnesses.

CLAUS HINRICH KÖHN.

Witnesses:
RUDOLPH FRICKE,
SOUTHARD P. WARNER.